ELECTRONIC DIGITAL COMPUTER WITH AUTOMATIC INTERRUPT CONTROL

Filed Oct. 22, 1962 3 Sheets-Sheet 1

INVENTORS.
WILLIAM A. LOGAN
RICHARD STANTON SHARP
GEORGE CLARK OLIPHINT
PAUL O. KING
BY Christie, Parker & Hale
ATTORNEYS.

ELECTRONIC DIGITAL COMPUTER WITH AUTOMATIC INTERRUPT CONTROL

Filed Oct. 22, 1962 3 Sheets-Sheet 2

INVENTORS.
WILLIAM A. LOGAN
RICHARD STANTON SHARP
GEORGE CLARK OLIPHINT
PAUL D. KING
BY Christie, Parker & Hale
ATTORNEYS

ELECTRONIC DIGITAL COMPUTER WITH AUTOMATIC INTERRUPT CONTROL

Filed Oct. 22, 1962 3 Sheets-Sheet 3

INVENTORS.
WILLIAM A. LOGAN
RICHARD STANTON SHARP
GEORGE CLARK OLIPHINT
PAUL D. KING
BY Christie, Parker & Hale
ATTORNEYS.

United States Patent Office 3,286,236

Patented Nov. 15, 1966

3,286,236

ELECTRONIC DIGITAL COMPUTER WITH AUTOMATIC INTERRUPT CONTROL

William A. Logan, Covina, Richard Stanton Sharp, Sierra Madre, and George Clark Oliphint, San Gabriel, Calif., and Paul D. King, New York, N.Y., assignors to Burroughs Corporation, Detroit, Mich., a corporation of Michigan Filed Oct. 22, 1962, Ser. No. 232,016
8 Claims. (Cl. 340—172.5)

This invention relates to electronic digital computers, and more particularly relates to a computer which is designed to automatically process interrupt conditions.

In most electronic digital computers it has been necessary to automatically interrupt operation under a variety of operating conditions. For example, parity errors, overflow of certain registers, and various other conditions indicating improper operation or improper programming of a computer have caused interruption of the operation of the computer. The computer could not be used until the condition had been corrected either by reprogramming the problem, correcting mechanical or electrical defects in the system or taking other measures which were appropriate for correcting the abnormal operating condition when it occurred. As computing systems have become more advanced and they have been made more automatic in their operation, it has become desirable that the computing system itself be able to correct many of the interrupt conditions.

In computing systems such as that described in copending application Serial No. 89,866, filed February 16, 1961 in the name of King et al., a plurality of input/output units, processors, and memory modules are provided in one computing system. A number of problems can be programmed simultaneously in the computer system and the computer arranged to switch between programs or to simultaneously run several programs in a way that utilizes most efficiently all of the equipment comprising the entire system. In such a computer system, the interrupt concept has been enlarged to include not only conditions in which errors have been developed which cause interruption of the working of the system but also to include conditions where the processing in one program can be interrupted to permit other operations to take place. For example, input/output operations have usually been controlled by the individual program in process. By making control of the input/output operations independent of individual programs and using an interrupt, any program can be stopped and operation of the processor turned over to the job of putting input/output equipment to work and then returning automatically to the program being processed. The interrupt concept can be used to load new programs into one or more processors, to bring in new information to selected ones of the memory modules from a bulk storage, and many other such operations can be initiated through the interrupt concept of the present invention.

According to the present invention, in order to handle various interrupt conditions, a processor in the computer system is automatically made available to process a "fix-up" routine in response to an interrupt condition. Special programs are stored in the computer system which can be brought into the processor and executed in response to particular interrupt conditions which may occur. The present invention provides automatic and program independent means of handling interrupt conditions, permitting the computer system to handle a number of programs which can be run automatically.

In brief, the present invention is incorporated in a digital computing system having a plurality of input/output units each of which generates at least one interrupt signal in response to predetermined operating conditions of the unit, one or more processor units for executing stored programs and performing various arithmetic and logical operations, each processor including means for generating a plurality of interrupt signals in response to different predetermined operating conditions of the processor, and at least one memory unit including means for generating interrupt signals in response to certain operating conditions. Gating means receives the interrupt signals from all the input/output units, the processor units and the memory units and sets a single predetermined address in an address register corresponding to the interrupt signal assigned the highest priority. In response to any interrupt signal, normal operation of one of the processor units is interrupted and it is placed in a control state in which the existing contents of all the registers, flip-flops and counters in the processor are automatically stored in sequential locations in the memory unit and the interrupt address register is examined to initiate and execute a selected fix-up routine in the processor. At the end of the fix-up routine, the interrupt address register is again examined and if a lower priority interrupt condition exists its address is used to initiate and execute another fix-up routine. If at the end of any fix-up routine, the interrupt address register is clear of any interrupt addresses the processor is returned to its normal mode of operation by reloading all the registers, counters and flip-flops from the memory unit, and the operation continues in the processor from the point of operation existing at the time of the interrupt.

For a more complete understanding of the invention, reference should be made to the accompanying drawings, wherein.

As pointed out above, the term "interrupt" condition as used herein does not refer to an interruption of operation of the computer system, but rather to an interruption to the normal operation of a processor and transfer of the processor to a control state in which the processor executes special programmed routines. Each condition producing an interrupt calls in to play its own special routine after the processor is placed in the control state. The processor, under operation of the special routine, performs the operations necessary to satisfy the interrupt condition and the processor is then returned to the normal state and resumes whatever operation it was performing at the time the interrupt condition was encountered. The interrupt condition may take a variety of forms. For example, an interrupt condition is generated whenever the transfer between an input or output unit and a memory module is completed. The interrupt condition permits the processor, when in the control state, to initiate a new input/output operation. The processor is then returned to its normal operation. In this way, external operations can be initiated and then carried out by only a momentary interruption of the normal operation of the processor. Interrupt conditions can be initiated and the processor placed in the control state in response to parity errors in any of the processors or for a variety of other error conditions in the processors, such as overflow of an assigned portion of memory, an invalid address, dividing by zero, exponent underflow or overflow in floating-point operation, and the like.

Figure 1:
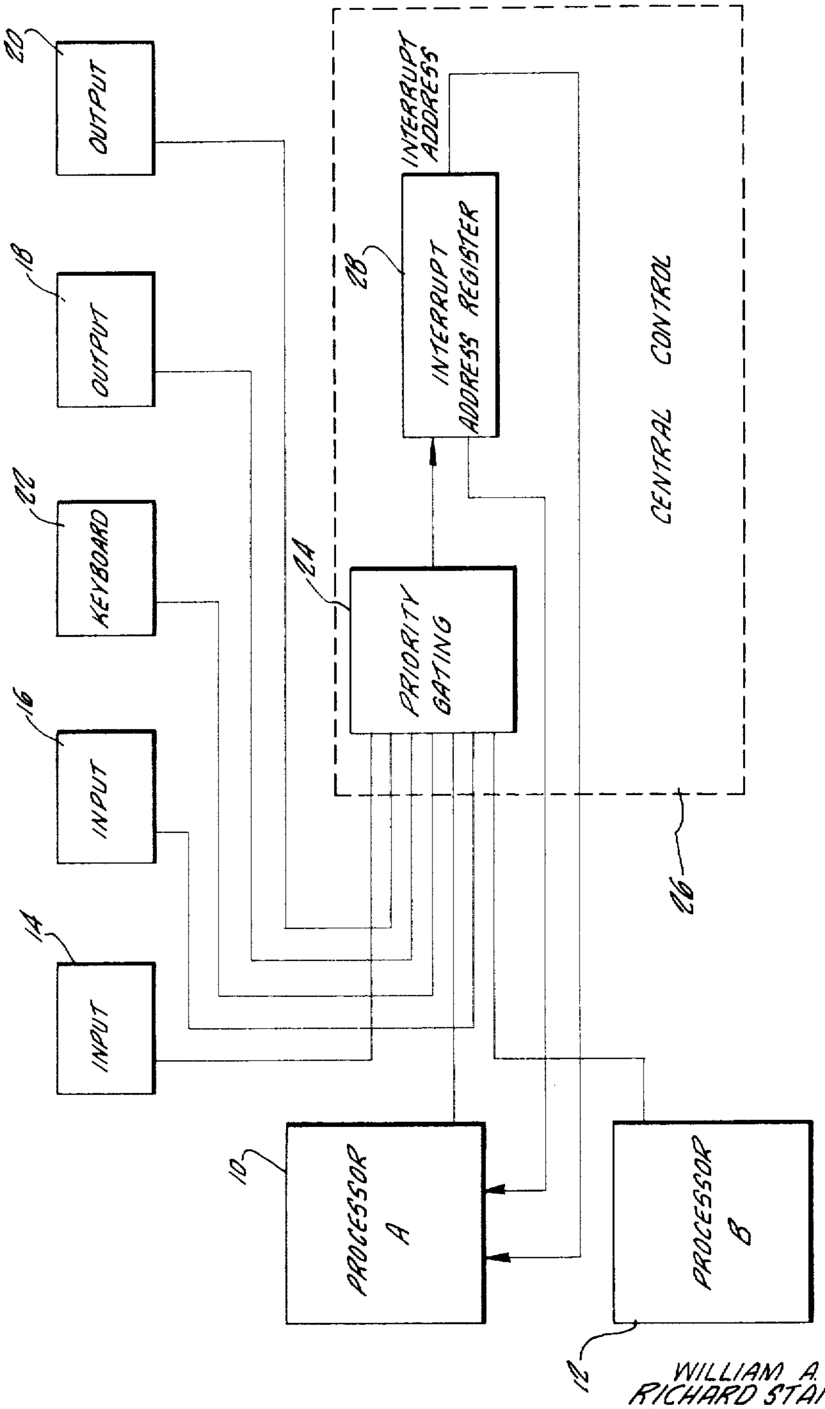
FIGURE 1 is a block diagram of a computer system of the type incorporating the features of the present invention.

Referring to FIGURE 1, the arrangement of a computing system is shown in block form. The numeral 10 indicates generally a digital processor for executing an internally stored program. The processor 10, which will hereinafter be described in more detail, is of a type described in co-pending application Serial No. 84,156, filed January 23, 1962, in the name of Paul D. King and Richard Barton and assigned to the same assignee as the present invention. The processor 10 may include its own memory, or separate memory modules may be provided as described in the above-identified co-pending application Serial No. 89,866. The computer system may in addition have other processors, such as the processor indicated at 12. The processors 10 and 12 are designated A and B respectively to distinguish them from each other. Internally both processors are substantially identical.

In addition, the computing system as shown in FIGURE 1 includes a plurality of input units such as indicated at 14 and 16, which may take any one of a variety of forms such as a card reader, punch tape, magnetic tape, or typewriter. In addition, the computer system includes a plurality of output units such as indicated at 18 and 20, the output units taking any one of a number of forms such as card punch, tabulator, magnetic tape, or plotter. In addition, the computer system may include a manual keyboard 22.

As pointed out above, each of the input and output units as well as the processors generate interrupt signals in response to certain predetermined operating conditions, which operating conditions may take any one of a number of forms as discussed above. The interrupt signals generated by the processors, input and output units, are all applied to the priority gating circuit 24 which is included in the central control unit indicated generally at 26. The priority gating circuit 24, which will be hereinafter described in more detail, is arranged to generate a coded address at the output for each particular interrupt signal received. Furthermore, the priority gating circuit 24 is arranged to generate only one address even though a plurality of interrupt signals are simultaneously received. The address generated at the output of the priority gating circuit 24 generates the address of the interrupt signal which is given highest priority according to a predetermined priority arrangement of interrupt signals. The address generated by the priority gating circuit 24 is stored in an Interrupt Address register 26. The presence of an address in the Interrupt Address register 26 causes processor A to interrupt its operation and to enter a control state. When in the control state, the processor A executes a stored program identified by the address stored in the Interrupt Address register 26.

Figure 3:
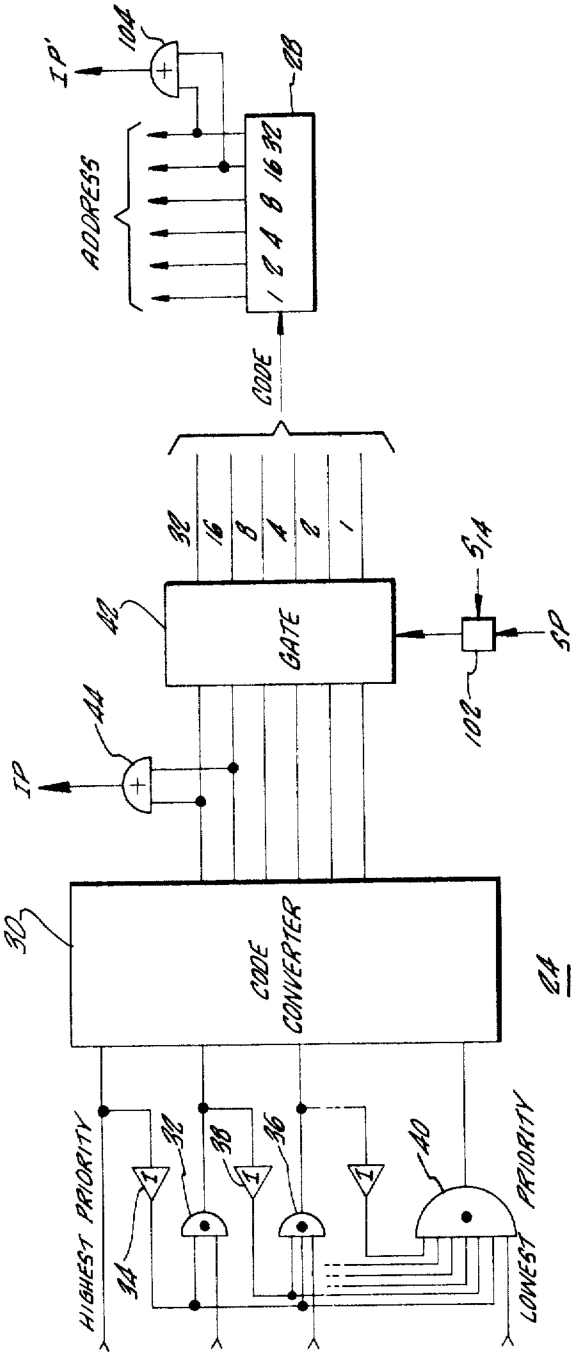
FIGURE 3 is a logic diagram for a suitable gating circuit to control the interrupt address operation.

FIGURE 3 shows a suitable priority gating circuit 24. The gating circuit includes a code converter 30 for converting a 1-out-of-*n* code to a binary code. The output of the code converter 30 is preferably a six bit binary code. The input to the code converter 30 is derived from the various input, output and processor units of the computer system which, as pointed out above, generate output signals in response to various interrupt conditions.

The interrupt condition having the highest priority is applied directly to the code converter 30 producing a six bit binary address on the output of the converter 30 identifying the highest priority interrupt condition. The second highest priority interrupt signal is applied first to a priority gating arrangement including a "logical and" circuit 32. The highest priority signal is also applied to the "and" circuit 32 through an inverter 34. Thus a high level is produced at the output of the "and" circuit 32 when the second highest priority signal is present and the highest priority signal is not present. Similarly, the third highest priority interrupt signal is applied to a "logical and" circuit 36 to which is also applied the output of the inverter 34 and also the output of the "and" gate 32 through an inverter 38. Thus the third highest priority interrupt signal provides an output of the "and" gate 36 only if no higher priority interrupt signal is present. Each lower priority interrupt signal is similarly applied to a "logical and" circuit. Thus the lowest order of priority interrupt signal is applied to "logical and" circuit 40 to which is applied the output of all the higher priority "logical and" circuits through inverters. Thus the lowest priority interrupt signal produces an output of the "and" gate 40 only when no higher priority interrupt signal is present.

The code converter 30 generates a six bit binary address identifying the highest priority interrupt signal being received. This six bit address is set in the register 28 by coupling it through a gating circuit 42. Because only addresses of 16 or higher are used, the 16 bit or 32 bit will always be present at the output of the gate 42 when an interrupt condition is present. These two bits are applied to a "logical or" gate 44, the output of which thus indicates that an interrupt condition, designated IP, is present.

Figure 2:
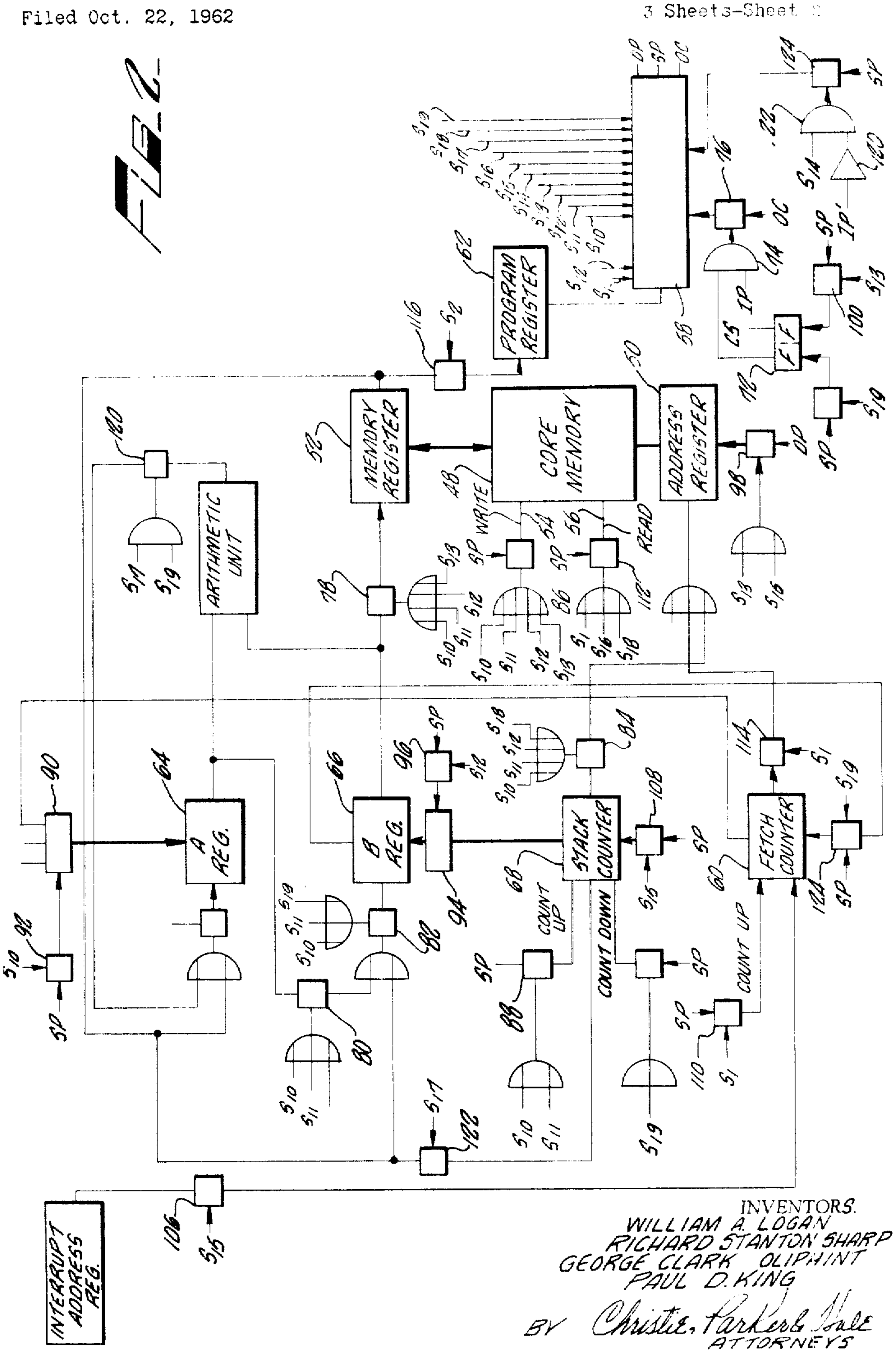
FIGURE 2 is a block schematic diagram of one processor unit incorporating the features of the present invention.

As mentioned above, it is assumed that processor A is used to process interrupt conditions when they exist. FIGURE 2 shows in block form the basic arrangement of the processor. The processor has associated therewith a core memory module 46 including a core memory 48 for storing binary coded words in addressable memory locations. The memory module includes an address register 50 and a memory register 52. In operation, words are transferred between the location in the core memory 48 identified by the address register 50 and the memory register 52. If the "white" input 54 is receiving a signal, the transfer will be from the memory register into the core memory. If the "read" input 56 is receiving a signal, the transfer will be from the core memory 48 to the memory register 52.

In normal operation, as described in copending application Serial No. 84,156, a control unit 58 causes program control words to be fetched from memory and executed in sequence. The contents of the fetch counter 60 are placed in the address register 50 and a program word is transferred out of the location in the core memory identified by the address derived from the fetch counter 60. The program word is placed in a program register 62. The control unit 58 in response to the coded characters in the program register 62 causes the processor to execute the particular operation established by the program word. The counter 60 is counted up each time to address the next program word.

One of the features of the processor described in the above-mentioned co-pending application Serial No. 84,156 is that it incorporates a temporary storage facility called a "stack" in which all operands are temporarily stored as they are called out of memory, and are made available to the arithmetic unit in the reverse order in which they are placed in the stack. The stack includes an A-register 64 and a B-register 66 and a portion of the core memory 48 identfied by the contents of a stack counter 68. Arithmetic operations are performed by an arithmetic unit 69 on the operands stored in the A-register and B-register, with the result of the arithmetic operation being returned to the A-register 64. Operands are placed in the stack by placing the operands initially into the A-register 64. Generally, the operands will be derived from the core memory module 46 in response to a program word in the register 62. As additional operands are placed in the A-register of the stack, the operands already in the stack are in effect moved down into the stack. Thus the operand in the A-register is transferred to the B-register and the operand in the B-register is transferred to the location in the core memory identified by the stack counter 68. The stack counter 68 is then counted up one. As additional operands are placed in the stack, operands already in the stack, are similarly moved down from the A-register to the B-register and from the B-register to the core memory location identified by the stack counter 68. As arithmetic operations are performed, leaving the B-register 66 empty following an arithmetic operation, the stack may be adjusted by transferring an operand from the core memory 46 to the B-register 66 and counting the stack counter 68 down one. The operation of the stack is described in greater detail in the above-mentioned co-pending application Serial No. 84,156.

Whenever an interrupt condition is produced in the computer system, the processor A is placed in the control state in which the processor is used to execute a special stored routine devised to correct, fix up, or otherwise satisfy and clear the interrupt condition to again free the processor for normal operation. Normally the processor does not enter the control state until it has completed the execution of the particular program word stored in the program register 62. However, for certain interrupt conditions, such as parity errors or invalid addresses in the processor, which would result in errors in the execution of a particular program word, the processor does not complete the execution of the program word but rather enters the control state immediately. For the present discussion, it will be assumed that an interrupt condition has been generated in the computer system which does not involve a parity error or invalid address in processor A.

At the completion of the execution of any program word, an operation complete pulse, designated OC, is generated by the control unit 58. This normally resets the control unit 58 back to the $S_1$ state to effect a fetch operation of the next program word from the address set by the fetch counter 60 in the core memory 48, transferring the next program word to the register 62. If, at the completion of an operation, an interrupt condition exists, this will be sensed by a high level IP at the output of the "or" gate 44. At the same time, a flip-flop 72, called the control state flip-flop, indicates that the processor is in the normal state. This is evidenced by a high level on the output of the flip-flop designated NS. The NS level and the IP level are applied to a logical "and" gate 74 which controls a gate 76 to which the OC pulse is applied. If the processor is in the normal state and an interrupt signal is present, the OC is passed by the gate 76, setting the control unit 58 directly to the $S_{10}$ state. Thus the normal fetch states $S_1$ and $S_2$ are not involved. In the $S_{10}$ state and subsequent states developed by the control unit 58, the processor is placed in the control state and made ready to process the proper fix-up routine associated with the particular interrupt condition which prevails.

To this end, during the $S_{10}$ state, the now high $S_{10}$ level is applied to a gate 78 coupling the B-register 66 to the memory register 52 to effect transfer of the word in the B-register 66 to the core memory register 52. At the same time, the $S_{10}$ state is applied to a gate 80 and a gate 82 to effect transfer of a word stored in the A-register 64 to the B-register 66. Further during the $S_{10}$ state, the contents of the stack counter 68 are transferred to the address register 50 by applying the $S_{10}$ state to a gate 84. If serial operation is used, shift pulses would be applied to the registers 52, 64 and 66 to effect the transfer.

At the completion of the $S_{10}$ state, a sequence pulse, designated SP, is generated by the control unit 58 and is applied to the "Write" input 54 by means of a gate 86 which is biased open during the $S_{10}$ state. At the same time, the stack counter 68 is counted up one by applying an SP through a gate 88 also biased open during the $S_{10}$ state. Also the contents of the fetch counter 60, which stores the address of the next program word in the program that was being executed at the time the interrupt condition occurred, is transferred to the A-register 64 through a gating circuit 90. The gating circuit 90 is pulsed by the SP passed by a gate 92. By placing the contents of the fetch counter 60 into the A-register 64, this information can be placed in the temporary storage provided by the stack. The contents of other registers and control flip-flops which may be part of the processor and used during normal operation may also be transferred to the stack at this point in the operation.

When the control unit 58 is advanced to the $S_{11}$ state by the SP, the stack is again pushed down in effect by transferring the contents of the B-register 66 to the memory register 52 through the gate 78 and transferring the contents of the A-register 64 to the B-register 66 through the gates 80 and 82, using the address provided by transferring the contents of the stack counter 68 to the memory address register 50. At the completion of the $S_{11}$ state, the SP counts up the stack counter through the gate 88, writes the contents of the memory register 52 into the core memory 48, and advances the control unit 58 to the $S_{12}$ state.

During the $S_{12}$ state, the information for returning the processor to the normal state, now stored in the B-register 66, is transferred to the memory register 52 through the gate 78. At the same time, the contents of the stack counter 68 are used to set the address register 50 through the gate 84. The SP generated at the end of the $S_{12}$ state then "Writes" the return information word into the core memory 48. At the end of the $S_{12}$ state, the content of the stack counter 68 is transferred to the B-register 66 through a gating circuit 94. The gating circuit 94 is pulsed by the SP which is passed through a gate 96 at the end of the $S_{12}$ state.

With the control unit 58 then advanced sequentially to the $S_{13}$ state, a predetermined address is set into the address register 50 by applying a digit pulse DP from the control unit 58 through a gating circuit 98. This sets the address register 50 to a predetermined address designation in which the return point information for the stack counter can be stored for future reference. Also during the $S_{13}$ state, the contents of the B-register 66 are transferred to the memory register 52 through the gate 78. At the conclusion of the $S_{13}$ state, the SP generated is applied to the "Write" input 54 through the gate 86. At the same time, the control state flip-flop 72 is set to the control state by the SP passed by the gate 100 which is biased open during the $S_{13}$ state. The processor is now placed in the control state in which it is free to process the particular fix-up routine necessary to clear the interrupt condition. It will be noted that the fetch counter 60 and the contents of the A-register 64 and B-register 66 have been placed in the stack portion of the memory 48 associated with the main program. The contents of the stack counter which identified the location of the stack is stored in a predetermined address location from which it can be later recovered when the processor returns to the normal state. Thus the processor is now clear to process any interrupt routine and later return to the same condition it was in at the time the interrupt condition placed it in the control state.

The control unit 58 advances sequentially from the $S_{13}$ to the $S_{14}$ state in which the gate 42 is actuated to set the interrupt address register 28 to the address of the interrupt condition having the highest priority as identified by the code converter 30. To this end, the SP generated at the end of the $S_{14}$ state is applied to the gate 42 through a gate 102. If an address is placed in the interrupt address register 28, this is sensed by a "logical or" gate 104 connected to the flip-flops in the register storing the 16 and 32 bits of the address. As mentioned above, the interrupt addresses are all in a range which includes one or the other of the two highest order bits in the six bit binary coded address. The interrupt present level at the output of the "or" gate 104, designated IP', is used to determine if an interrupt condition is still present and, if so, to initiate the execution of the proper routine to clear the interrupt condition. If there is no interrupt condition present, indicated by a low level at the output IP' from the "or" gate 104, operation is undertaken to place the processor back in the normal state.

Assuming that an interrupt condition exists, the control unit 58 automatically advances from the $S_{14}$ state to the $S_{15}$ state in sequence. During the $S_{15}$ state, the address stored in the Interrupt Address register 28 is transferred by means of a gate 106 to the fetch counter 60. At the same time, the stack counter 68 is set to some predetermined value to identify a temporary storage region for use as a stack in executing the fix-up routine. To this end, the SP is gated by the gate 108 during the $S_{15}$ state to the stack counter 68 for setting the stack counter 68 to the desired value. At the end of the $S_{15}$ state, an operation clear pulse, OC, is generated and the control unit 58 is returned to the $S_1$ state.

The normal fetch operation for initiating the execution of a program word, which in this case is the first word of a fix-up routine for the particular interrupt condition which exists, is now carried out. Thus the $S_1$ state applied to a gate 114 transfers the address from the fetch counter 60 to the memory address register 50. At the end of the $S_1$ state, the SP generated counts up the fetch counter through a gate 110 and causes readout of the core register 48 to the memory register 52 by applying the SP through a gate 112 to the "Read" input 56 of the core memory 48. During the $S_2$ state, the program word in the memory register 52 is transferred by means of a gate 116 to the program register 62 where it is decoded by the control unit 58 and executed in the same manner as all program words executed by the processor.

Each interrupt rountine involves its own program of operators which are permanently stored in the computer. The particular routine which an interrupt might call into operation during the control state forms no part of the present invention and may take a variety of forms depending upon the particular interrupt condition which prevails.

One program control word or operator which is of special interest to the control state operation of the processor is called the Interrogate Interrupt operator. This operator is provided as the last operator in the string of operators forming an interrupt routine. When it is fetched from memory and placed in the program register 62 during the $S_1$ and $S_2$ states, the Interrogate Interrupt operator is decoded by the control unit 58, setting the control unit 58 from the $S_2$ to the $S_{14}$ state. At this time, if an interrupt condition still exists anywhere in the computer system, the address will be gated by the gate 42 to the Interrupt Address register 28. The contents of the Interrupt Address register 28 are then transferred to the fetch counter 60 during the $S_{15}$ state and a new interrupt routine is thus initiated. If no interrupt condition pertains, a low level IP' will be present at the output of the "or" gate 104, which level is applied through an inverter 120 (see FIG. 2) to a "logical and" gate 122 along with the $S_{14}$ level. The output level from the "logical and" gate 122 controls a gate 124 so that when the control unit 58 is in the $S_{14}$ state and no interrupt address is present, the control unit 58 is set to the $S_{16}$ state thus skipping the $S_{15}$ state. During the $S_{16}$ state and subsequent states of the control unit 58, the processor is returned to the normal state in condition to execute the next operator in the main program string.

To this end, with the control unit 58 in the $S_{16}$ state, the address of the return word is set into the address register 50 by means of the gating circuit 98, which is biased open to pass a DP to set the various flip-flops in the address register 50 in response to the $S_{16}$ state. At the end of the $S_{16}$ state, an SP is applied through the gate 112 to read the return control word into the memory register 52. During the $S_{17}$ state, the contents of the memory register 52 are transferred through a gate 120 and a gate 122, each of which is biased open during the $S_{17}$ state, to the stack counter 68. The stack counter is now reset to the address of the last word placed in the stack before the processor entered the control state. The word addressed by the stack counter includes the information necessary to reload the fetch counter 60 and to reset other registers and flip-flops as the case may be to the condition they were in when the control state was entered in response to an interrupt.

Thus during the $S_{18}$ state, the address in the stack counter 68 is transferred by the gate 84 to the address register 50 and the readout from the core memory is effected by applying the $S_{18}$ state to the gate 112. During the $S_{19}$ state, the word now placed in the memory register 52 is transferred to the B-register 66 by means of the gate 120 and the gate 82. The SP generated at the completion of the $S_{19}$ state is used to transfer the address information in the word now stored in the B-register 66 to the fetch counter 60 through a gate 124. The computer is now back in the identical condition it was in at the time an interrupt condition was initiated except that the A-register and B-register have not been reloaded from the stack. It is not necessary to reload the A-register and B-register at this point. They may be reloaded by the next program word in the program string in the manner described in detail in co-pending application Serial No. 84,156.

From the above description, it will be seen that a unique arrangement has been provided in which an interrupt can occur at any point in the execution of a program in a processor. The processor is automatically placed in the control state in which all of the contents of the registers used in the execution of the main program are transferred to the stack memory. The processor is thus freed to execute the fix-up routine called into operation by the interrupt condition. At the end of the interrupt condition, if no further interrupt conditions are indicated, the processor automatically returns to the point of operation it was at at the time the interrupt was initially received.

What is claimed is:

1. A digital computing device comprising a plurality of input/output units, each unit generating at least one interrupt signal in response to a predetermined operating condition of the unit, at least one processor unit including means for generating a plurality of interrupt signals in response to predetermined operating conditions, the processor including a plurality of registers, counters, an arithmetic unit, and control circuitry for executing a sequence of program words, at least one memory unit including means for generating interrupt signals in response to predetermined operating conditions, an interrupt address register, gating means for receiving all the interrupt signals from the input/output units and the processor unit and setting a different single predetermined address in the address register for each interrupt signal on a predetermined priority basis where more than one interrupt signal is received at a time, means responsive to an interrupt signal for interrupting the normal operation of the processor unit and placing the processor in a control state, said processor interrupting means including means for clearing and storing the contents of selected registers and counters in the memory unit, means responsive to the contents of the address register when the processor is in the control state for initiating and executing a selected fix-up routine in the processor, means for sensing the address register at the end of the fix-up routine and initiating and executing a different fix-up routine in the processor in response to a different address in the interrupt address register, said sensing means including means for restoring the processor to normal operation if the address register has no interrupt address.

2. Apparatus as defined in claim 1 wherein said restoring means includes means for automatically reloading the registers and counters with the information stored in the memory unit by the processor interrupting means.

3. In a stored program operated digital computer having at least one processor, a memory unit, and an input/output unit each capable of generating interrupt signals when predetermined operating conditions are encountered, the processor having a plurality of registers, counters, an arithmetic unit, gating and control circuitry for executing programs stored in the memory unit, apparatus for automatically handling the interrupt conditions comprising means responsive to any of said interrupt signals for interrupting the operation of the processor and transferring the contents of the registers and counters of the processor to sequential locations in the memory unit, an interrupt address register, means responsive to the interrupt signals for setting the address register to a predetermined setting identifying a particular interrupt condition, said address register setting means including means setting the address register according to a predetermined priority sequence when more than one interrupt signal is received, and means responsive to the setting of the address register for addressing a selected fix-up program in the memory unit and initiating execution of the selected program by the processor.

4. Apparatus as defined in claim 3 further including means responsive to the interrupt address register at the completion of the execution of any fix-up program for addressing an additional fix-up program if the interrupt address register contains an interrupt address, and means responsive to the interrupt address register at the completion of any fix-up program for reloading the registers and counters of the processor from the memory unit if no interrupt address is present and reinitiating execution of the program being executed prior to the interrupt condition.

5. Digital computer apparatus having stored program words, said apparatus comprising an addressable memory unit, a pair of registers for storing two operands, a fetch counter for sequentially addressing program words in the memory unit, a temporary storage address counter, means for generating interrupt signals in response to predetermined operating conditions in the digital apparatus, means responsive to any one of the interrupt signals for interrupting the sequential addressing by the fetch counter, said last-named means including means responsive to the address in the temporary storage counter for transferring the contents of one of the registers to the corresponding location in the memory unit and advancing the temporary storage counter, means responsive to the next address in the temporary storage counter for transferring the contents of the other of the registers to the corresponding location in the memory unit and advancing the temporary storage counter, means responsive to the next address in the temporary storage address counter for transferring the contents of the fetch counter to the corresponding location in the memory unit, means responsive to any one of the interrupt signals for storing the contents of the temporary storage address counter in a predetermined location in the memory unit, and means for resetting the fetch counter to a particular value determined by the interrupt signal generated, whereby a selected sequence of program words can be addressed by the fetch counter in response to a particular interrupt signal generating condition.

6. Digital computer apparatus having stored program words, said apparatus comprising an addressable memory unit, a pair of registers for storing two operands, a fetch counter for sequentially addressing program words in the memory unit, a temporary storage address counter, means for generating interrupt signals in response to predetermined operating conditions in the digital apparatus, means responsive to any one of the interrupt signals for interrupting the sequential addressing by the fetch counter, said last-named means including means responsive to the address in the temporary storage counter for transferring the contents of the two registers and the fetch counter to the memory unit to locations established by the temporary storage counter, means responsive to any one of the interrupt signals for storing the contents of the temporary storage address counter in a predetermined location in the memory unit, and means for resetting the fetch counter to a particular value determined by the interrupt signal generated, whereby a selected sequence of program words can be addressed by the fetch counter in response to a particular interrupt signal generating condition.

7. A processor including a plurality of registers and control counters for processing digital data in response to a stored program and having a normal mode for executing a stored executive program and a control mode for executing any one of a number of stored interrupt fix-up programs, comprising an addressable memory for storing the executive program and the interrupt fix-up programs in coded form, means associated with the processor for generating a plurality of different interrupt signals in response to different predetermined operating conditions, temporary storage means, means responsive to an interrupt signal when the processor is operating in the normal mode for generating a signal indicating the control mode, means responsive to the control mode signal for transferring the contents of the registers and counters in the processor to the temporary storage, and means responsive to the control mode signal and said particular interrupt signal that produced the control mode signal for selecting and initiating execution of a particular fix-up routine.

8. A processor including a plurality of registers and control counters for processing digital data in response to a stored program and having a normal mode for executing a stored executive program and a control mode for executing any one of a number of stored interrupt fix-up programs, comprising an addressable memory for storing the executive program and the interrupt fix-up programs in coded form, means associated with the processor for generating a plurality of different interrupt signals in response to different predetermined operating conditions, temporary storage means, means responsive to an interrupt signal for transferring the contents of the registers and counters in the processor to the temporary storage, and means responsive to said particular interrupt signal for selecting and initiating execution of a particular fix-up routine.

References Cited by the Examiner

UNITED STATES PATENTS

| | | | |
|---|---|---|---|
| 3,048,332 | 8/1962 | Brooks | 340—172.5 |
| 3,079,082 | 2/1963 | Scholten et al. | 340—172.5 |
| 3,197,740 | 7/1965 | Terlato | 340—172.5 |
| 3,201,760 | 8/1965 | Schrimpf | 340—172.5 |
| 3,208,048 | 9/1965 | Killburn et al. | 340—172.5 |

ROBERT C. BAILEY, *Primary Examiner.*

P. L. BERGER, *Assistant Examiner.*